United States Patent [19]
Yamashina et al.

[11] Patent Number: 5,875,369
[45] Date of Patent: Feb. 23, 1999

[54] LENS-FITTED PHOTOGRAPHIC FILM UNIT

[75] Inventors: Yasuhiro Yamashina, Kanagawa; Takuya Arai, Tokyo, both of Japan

[73] Assignee: Fuji Photo Film Co., Ltd., Kanagawa, Japan

[21] Appl. No.: 928,703

[22] Filed: Aug. 13, 1992

[30]  Foreign Application Priority Data

Aug. 13, 1991 [JP] Japan ................................. 3-228287

[51] Int. Cl.⁶ ................................................. G03B 15/05
[52] U.S. Cl. ............................................................ 396/538
[58] Field of Search ............................... 354/288; 396/6, 396/535, 538, 540

[56]  References Cited

U.S. PATENT DOCUMENTS

| Re. 34,168 | 1/1993 | Ohmura et al. | 354/145.1 |
|---|---|---|---|
| 4,666,274 | 5/1987 | Maeno et al. | 354/64 |
| 4,797,697 | 1/1989 | Heuser et al. | 354/75 |
| 4,804,987 | 2/1989 | Arai | 354/219 |
| 4,866,469 | 9/1989 | Shiba et al. | 354/202 |
| 5,003,330 | 3/1991 | Kotani et al. | 354/145.1 |
| 5,005,035 | 4/1991 | Pagano | 354/206 |
| 5,081,482 | 1/1992 | Miki et al. | 354/288 |
| 5,150,140 | 9/1992 | Kitazawa | 354/145.1 |

FOREIGN PATENT DOCUMENTS

| 0224921 | 6/1987 | European Pat. Off. |
|---|---|---|
| 62-156641 | 7/1987 | Japan . |
| 63-221331 | 9/1988 | Japan . |
| 63-271434 | 11/1988 | Japan . |
| 6154244 | 6/1990 | Japan . |
| 0226721 | 10/1991 | Japan . |
| 2235984 | 3/1991 | United Kingdom . |
| 2236195 | 3/1991 | United Kingdom . |

*Primary Examiner*—Safet Metjahic
*Assistant Examiner*—Michael Dalakis
*Attorney, Agent, or Firm*—Young & Thompson

[57]  ABSTRACT

A lens-fitted photographic film unit has a main body which is provided with a film supply chamber and a film take-up chamber on opposite horizontal sides of an exposure chamber. A portion of the film unit including the exposure chamber and the film supply chamber is reduced in thickness. The front cover which is attached to the main body has a grip projection having the same shape as the film take-up chamber and a flat portion located in front of the exposure chamber and the film supply chamber. The flat portion is recessed with respect to the grip portion so as to reduce the thickness of most of the film unit. The grip projection makes it possible to hold the film unit with ease. The film unit is surrounded by an outer cover which exposes the grip projection.

27 Claims, 4 Drawing Sheets

LENS-FITTED PHOTOGRAPHIC FILM UNIT

BACKGROUND OF THE INVENTION

1. Field of the Invention

The present invention relates to a lens-fitted photographic film unit which is thinner than known units and which is provided with a grip that makes it easier to hold.

2. Prior Art

In the lens-fitted photographic film unit disclosed in U.S. Pat. No. 4,972,649, a taking lens, a film advancing mechanism and a shutter mechanism are incorporated in a main body. A photographic film cassette with a 135-type photographic film as defined by ISO code 1007, 1979 version is contained in the main body which is covered by a front cover and a rear cover for protecting the main body as well as the photographic film in a light-tight manner. The main body is provided on opposite horizontal sides of an exposure chamber with a film take-up chamber and a film supply chamber. When the unit is new, the film take-up chamber accommodates the photographic film cassette while the film supply chamber accommodates the photographic film wound in a roll after having been drawn out of the photographic film cassette. The rolled photographic film is rewound on a spool of the photographic film cassette in the film take-up chamber step-by-step, once for each exposure. Such a lens-fitted photographic film unit is box-shaped, and its thickness parallel to the optical axis of the taking lens is only slightly greater than the diameter of the photographic film cassette, in order to enhance its portability.

However, research has recently been carried out in an effort to make the size of compact cameras approach that of a cigarette case or even the size of a credit card. This trend has also been carried out in lens-fitted photographic film units. For this purpose, it has been sought to provide a photographic film cassette with a smaller diameter in order to use it in a lens-fitted photographic film unit. However, this proposal is unacceptable since such a new type of photographic film cassette would require alteration of conventional photographic printers.

The fact that the diameter of the 135-type photographic film cassette cannot be reduced has been an obstacle to making lens-fitted photographic film units thinner. Moreover, miniaturizing cameras increases the danger of occurrence of camera shaking at the time of shutter release.

OBJECT OF THE INVENTION

It is an object of the present invention to provide a lens-fitted photographic film unit which is thin and can be easily held for picture taking.

SUMMARY OF THE INVENTION

The above and other objects are accomplished by providing a main body of a lens-fitted photographic film unit such that a film take-up chamber thereof projects forward in a forwardly convex arcuate shape and the remaining portion of the main body is recessed or set back rearwardly. The main body is covered by a front cover having a forwardly convex grip portion for closing the front of the film take-up chamber, and a flat portion for closing the remainder of the main body. In a preferred embodiment, the film unit is enclosed by an outer casing except that the grip projection is bare.

According to the present invention, the front cover is provided with the grip projection, so that it is very convenient for photographers to hold the grip easily with the photographers' fingers for picture taking without inducing camera shake. Also, the thickness of the lens-fitted photographic film unit is reduced over the portion excluding the grip projection, whereby a compact lens-fitted photographic film unit is realized.

DESCRIPTION OF THE DRAWINGS

The above and other objects and advantages of the present invention will become apparent from the following description of preferred embodiments wit reference to the accompanying drawings wherein.

DETAILED DESCRIPTION OF THE PREFERRED EMBODIMENTS

Figure 1:
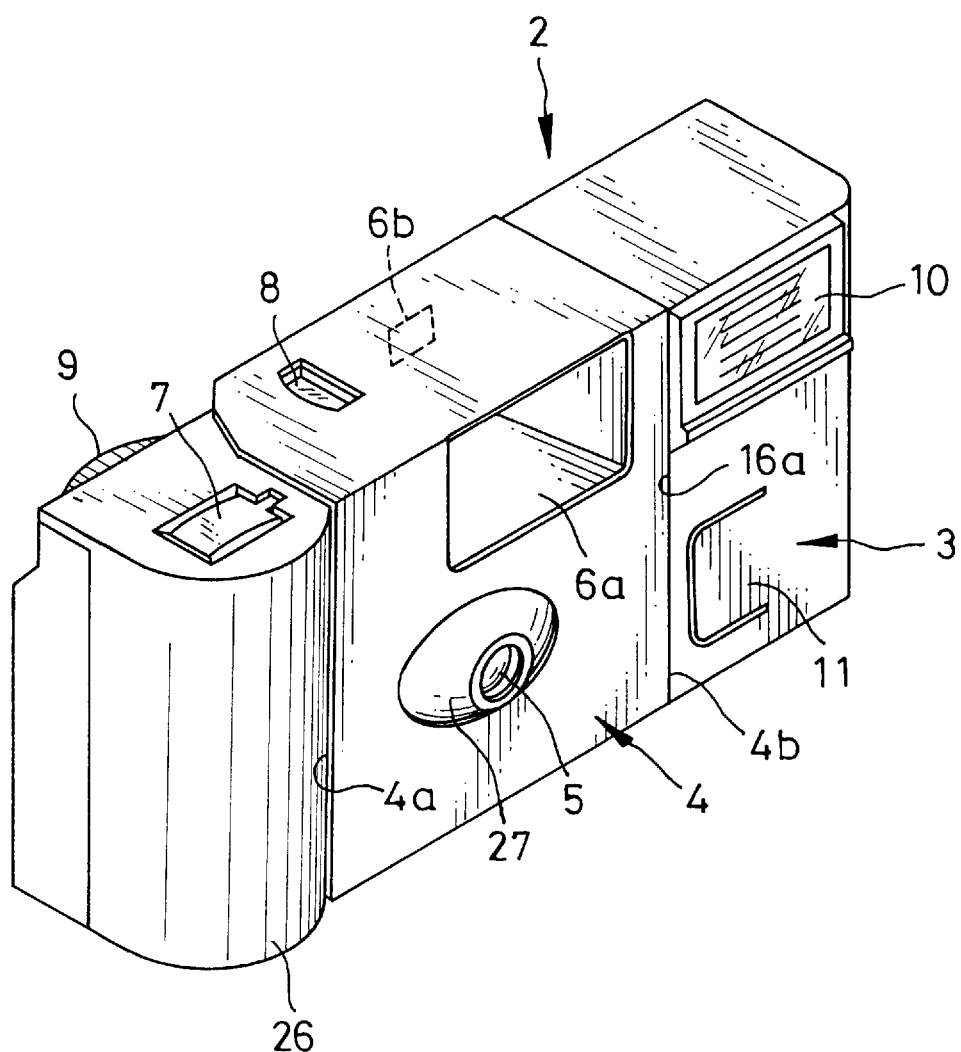
FIG. 1 is a perspective view of a lens-fitted photographic film unit of a preferred embodiment according to the present invention.

Referring to FIG. 1, a lens-fitted photographic film unit 2 comprises an outer cover 4 and a film housing 3 in which a photograph-taking mechanism is incorporated. The outer cover 4 is formed of a strip of cardboard having decoration and information printed thereon so as to impart an attractive external appearance. A plastic sheet may instead be used as the outer cover 4. The outer cover 4 encircles the middle portion of the film housing 3 and has a limited lateral extent so as to leave uncovered a film advancing wheel 9, a flash window 10, a shutter release button 7 and a grip projection 26.

Figure 2:
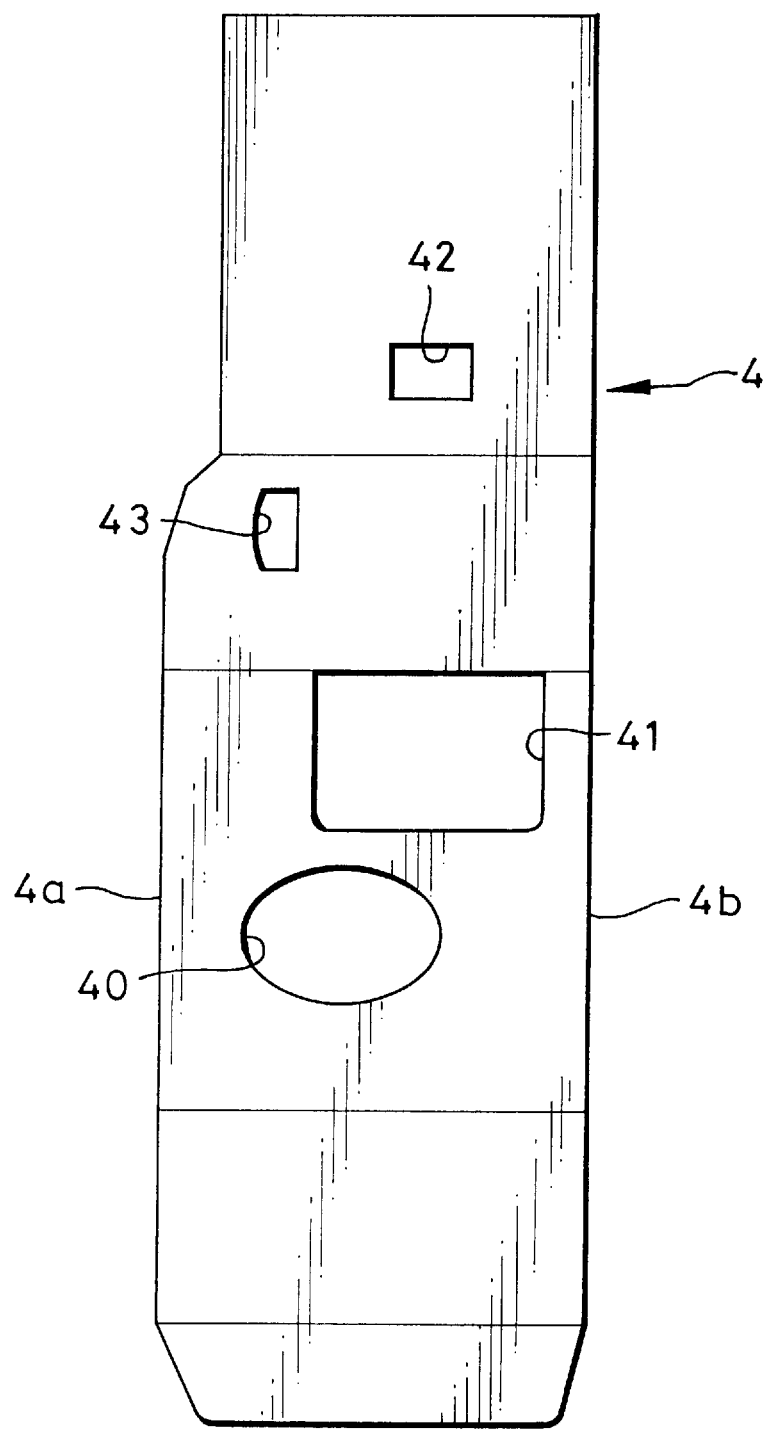
FIG. 2 is a development of an outer cover of the lens-fitted photographic film unit of FIG. 1.

As illustrated in FIG. 2, the outer cover 4 is provided with openings 40 to 43 for respectively exposing a taking lens 5, a front finder window 6a, a film frame counter 8 and a rear finder window 6b. An end 4a of the outer cover 4 is in contact with the grip projection 26 while an opposite end 4b thereof is in contact with a stepped portion 16a of a front cover 16 to be described later.

Figure 3:
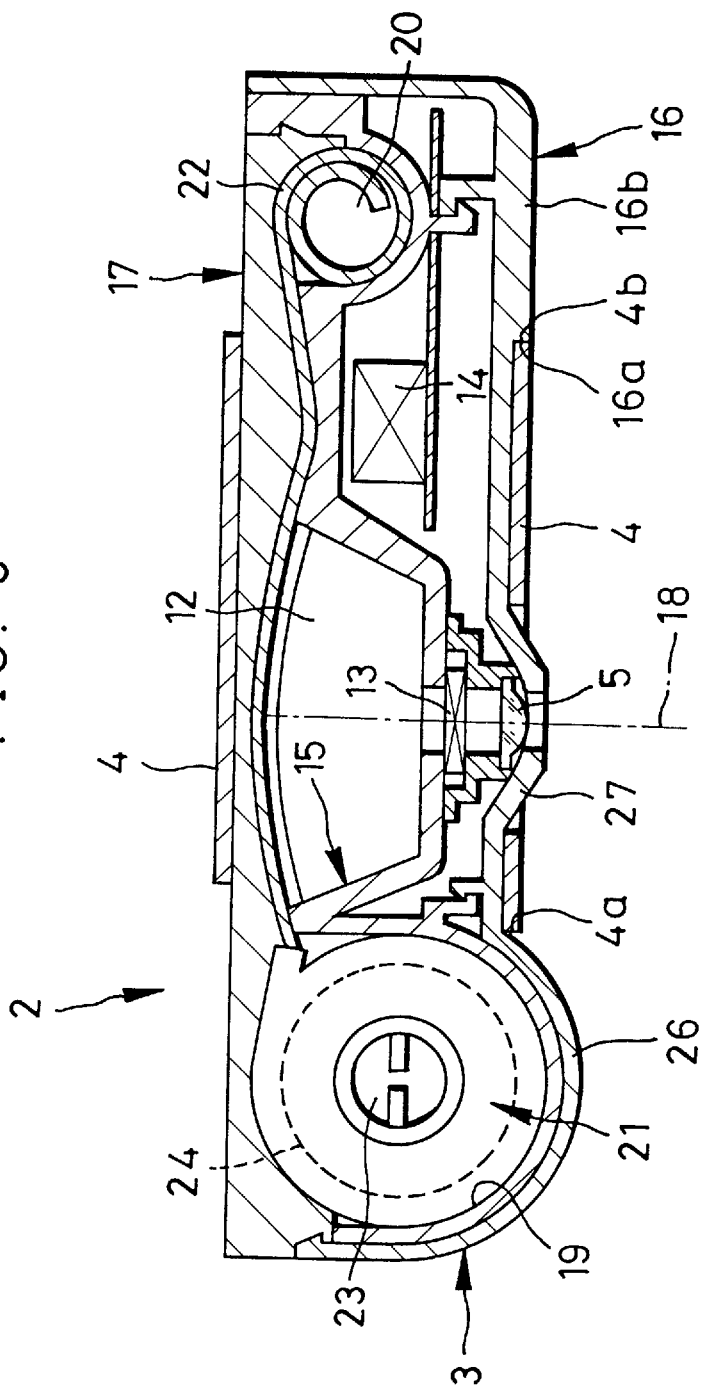
FIG. 3 is a cross section of the lens-fitted photographic film unit.

As illustrated in FIG. 3, the taking lens 5, a shutter mechanism 13, a film advancing mechanism (not illustrated) and a flash circuit 14 are incorporated in a main body 15 which is covered by the front cover 16 and a rear cover 17 to complete the film housing 3. Components used for the shutter mechanism 13, the film advancing mechanism and the flash circuit 14 are the same as those described in U.S. Pat. No. 4,972,649, and the description of their functions is omitted since it is not needed for describing this invention.

The main body 15 is formed on opposite lateral sides with a film take-up chamber 19 and a film supply chamber 20, with an exposure chamber 12 therebetween. The taking lens 5 is disposed at the front side of the exposure chamber 12 along an optical axis 18. In the course of assembly, a photographic film cassette 21 is disposed in the film take-up chamber 19. A 135-type unexposed photographic film 22 previously drawn out of the photographic film cassette 21 and wound in a roll is disposed in the film supply chamber 20 with a trailing end thereof secured to a spool provided in the photographic film cassette 21. After this, the rear cover 17 is attached to the rear side of the main body 15 so as to shield both chambers 19, 20 and the exposure chamber 12 from external light. When the main body 15 is observed in a cross section (see FIG. 3), the diameter of the film supply chamber 20 is smaller than that of flanges 24 of a spool 23. Furthermore, the diameter of the film take-up chamber 19 is determined by that of the photographic film cassette 21. Since the film supply chamber 20 is not provided with a core for winding the unexposed photographic film 22, it is possible to form the film supply chamber 20 of small diameter. It is preferable to form the film supply chamber 20 so as to have a diameter of 18.2 mm or less. The main body 15 can thus be considerably reduced in thickness, except the portion housing the film take-up chamber 19.

After the aforementioned shutter mechanism 13 and taking lens 5 and flash circuit 14 are attached to the front of the main body 15, the front cover 16 is attached to the main body 15 and to the rear cover 17 by means of claws so as to be easily detached for recycling. The front cover 16 has a grip projection 26 in the shape of a circular arc on the front surface of the film take-up chamber 19 and a flat portion 16b which is located in front of the exposure chamber 12 and the film supply chamber 20 and is recessed with respect to the grip projection 26. As a result, the thickness of the lens-fitted photographic film unit 2 excluding the grip projection 26 is reduced by 2 to 3 mm, as compared with that of conventional lens-fitted photographic film units. Because the front cover 16 is provided with a forwardly projecting lens hood 27, the taking lens 5 can be disposed such that the distance between the taking lens 5 and the photographic film 22 is conventional. The stepped portion 16a is formed in the front cover 16 so as to prevent movement of the outer cover 4.

The operation of the above preferred embodiment according to the present invention will be described briefly. When a photographer holds the lens-fitted photographic film unit 2 in order to take a photograph, his fingers grasp the grip projection 26 of the front cover 16. In this position, his fingers will not enter the light path of the taking lens 5. The photographer can hold the lens-fitted photographic film unit 2 firmly owing to the grip projection 26, so that camera shake can be preferably prevented when depressing the shutter release button 7. When taking a photograph with the electronic flash, the photographer's fingers can easily reach the flash charge switch 11, since the thickness of the photographic film unit 2 on the side of the film supply chamber 20 is reduced.

Figure 4:
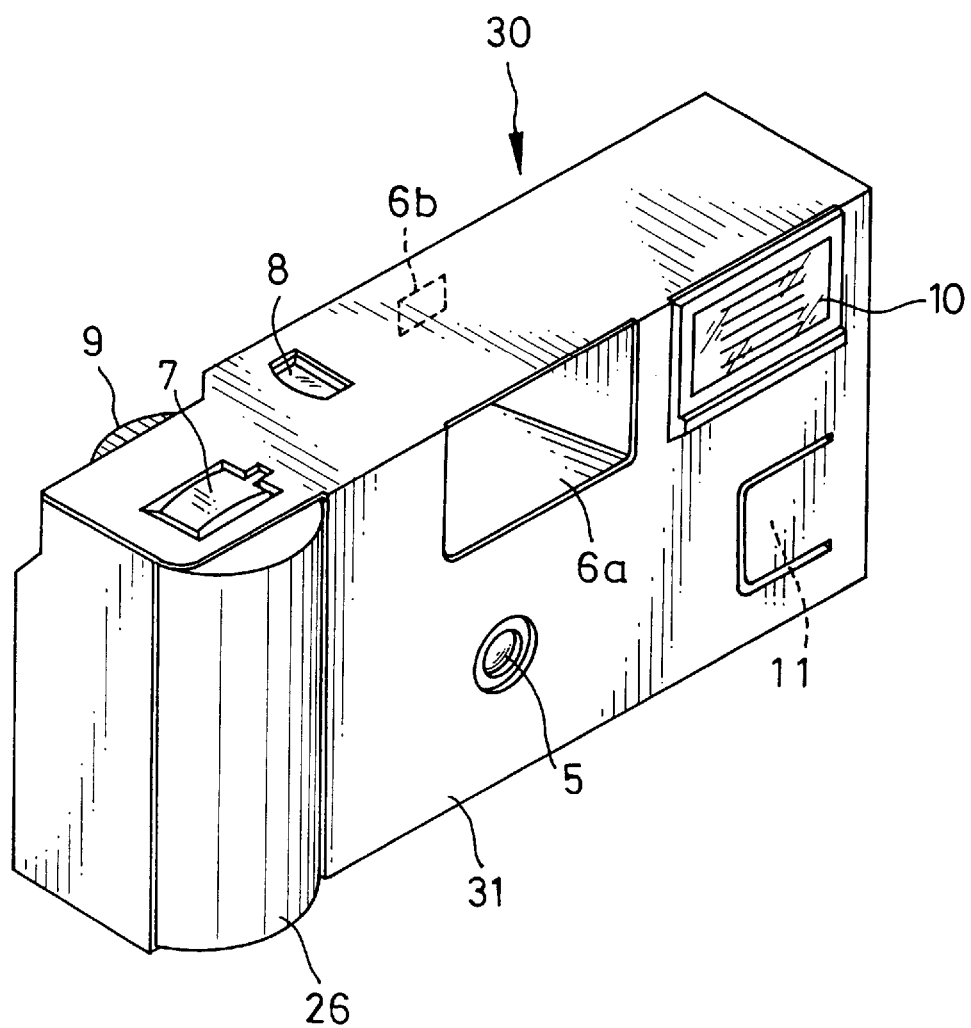
FIG. 4 is a perspective view of another example of a lens-fitted photographic film unit according to the present invention.

Although the front cover 16 is provided with lens hood 27 in the above preferred embodiment, the lens hood 27 may be omitted to form a much thinner lens-fitted photographic film unit 30, as illustrated in FIG. 4. The outer cover 31 is box-like as illustrated in FIG. 4. The outer 31 has openings for exposing the grip projection 26, the flash window 10 and the like. Elements the same as those in FIG. 1 are designated by like reference numerals.

In this embodiment, the grip projection 26 is formed by forwardly projecting the portion of the front cover 16 that closes the front of the film take-up chamber 19, but may instead be formed by rearwardly projecting a portion of the rear cover that closes the film take-up chamber.

It is to be understood that the present invention can be changed, altered and modified to various forms without departing from the scope of the invention as defined in the appended claims.

What is claimed is:

1. In a lens-fitted photographic film unit comprising:
a main body having a film take-up chamber and a film supply chamber on opposite horizontal sides of an exposure chamber and photograph taking means on a front side of said exposure chamber; a photographic film cassette accommodated in said film take-up chamber, a photographic film in a roll being disposed in said film supply chamber with a trailing end of said photographic film secured to a spool in said photographic film cassette; a rear cover for covering said main body from the rear so as to shield said photographic film from external light; and a front cover for covering said main body from front; the improvement wherein one of said covers has a grip projection to serve as a grip and a flat portion recessed with respect to said grip projection, and an outer cover of cardboard which is fitted on said lens-fitted photographic film unit so as to expose said grip projection and which has four flat sides interconnected by right-angle bend lines that are parallel to each other and that lie flat against four flat sides of said film unit, said outer cover having information printed thereon.

2. A lens-fitted photographic film unit as recited in claim 1, wherein said grip projection is on said front cover and projects forward.

3. A lens-fitted photographic film unit as recited in claim 1, wherein said film supply chamber is smaller than said film take-up chamber and an outside surface of said film take-up chamber protrudes relative to an outside surface of said film supply chamber.

4. A lens-fitted photographic film unit as recited in claim 3, wherein said outside surface of said film take-up chamber is a front surface that protrudes forward relative to a front outside surface of said film supply chamber.

5. A lens-fitted photographic film unit as recited in claim 1, wherein said grip projection of said one cover is configured along an outline of an outside surface of said film take-up chamber in the shape of a circular arc.

6. A lens-fitted photographic film unit as recited in claim 5, wherein said one cover is said front cover.

7. A lens-fitted photographic film unit as recited in claim 1, wherein said photograph taking means has a taking lens and a shutter mechanism.

8. A lens-fitted photographic film unit as recited in claim 1, wherein said outer cover has openings for exposing said taking lens, a front finder window, a rear finder window and a film frame counter.

9. A lens-fitted photographic film unit as recited in claim 2, wherein said front cover is provided on said flat portion with a lens hood which protrudes forwardly for accommodating said taking lens.

10. A lens-fitted photographic film unit as recited in claim 1, wherein said outer cover has a strip-like shape and surrounds only a middle portion of said lens-fitted photographic film unit.

11. A lens-fitted photographic film unit as recited in claim 1, wherein said front cover is provided with an abutment shoulder against which an end edge of said outer cover abuts so as to prevent said outer cover from being displaced.

12. In a lens-fitted photographic film unit comprising:
a main body having a film take-up chamber and a film supply chamber on opposite horizontal sides of an exposure chamber and photograph taking means on a front side of said exposure chamber; a photographic film cassette accommodated in said film take-up chamber, a photographic film in a roll being disposed in said film supply chamber with a trailing end of said photographic film secured to a spool in said photographic film cassette; a rear cover for covering said main body from the rear so as to shield said photographic film from external light; and a front cover for covering said main body from front; the improvement wherein one of said covers has a grip projection to serve as a grip and a flat portion recessed with respect to said grip projection, and an outer cover of plastic sheet which is fitted on said lens-fitted photographic film unit so as to expose said grip projection and which has four flat sides interconnected by right-angle bend lines that are parallel to each other and that lie flat against four flat sides of said film unit, said outer cover having information printed thereon.

13. A lens-fitted photographic film unit as recited in claim 12, wherein said grip projection is on said front cover and projects forward.

14. A lens-fitted photographic film unit as recited in claim 12, wherein said film supply chamber is smaller than said film take-up chamber and an outside surface of said film take-up chamber protrudes relative to an outside surface of said film supply chamber.

15. A lens-fitted photographic film unit as recited in claim 14, wherein said outside surface of said film take-up chamber is a front surface that protrudes forward relative to a front outside surface of said film supply chamber.

16. A lens-fitted photographic film unit as recited in claim 12, wherein said grip projection of said one cover is configured along an outline of an outside surface of said film take-up chamber in the shape of a circular arc.

17. A lens-fitted photographic film unit as recited in claim 16, wherein said one cover is said front cover.

18. A lens-fitted photographic film unit as recited in claim 12, wherein said photograph taking means has a taking lens and a shutter mechanism.

19. A lens-fitted photographic film unit as recited in claim 12, wherein said outer cover has openings for exposing said taking lens, a front finder window, a rear finder window and a film frame counter.

20. A lens-fitted photographic film unit as recited in claim 13, wherein said front cover is provided on said flat portion with a lens hood which protrudes forwardly for accommodating said taking lens.

21. A lens-fitted photographic film unit as recited in claim 12, wherein said outer cover has a strip-like shape and surrounds only a middle portion of said lens-fitted photographic film unit.

22. A lens-fitted photographic film unit as recited in claim 12, wherein said front cover is provided with an abutment shoulder against which an end edge of said outer cover abuts so as to prevent said outer cover from being displaced.

23. In a lens-fitted photographic film unit comprising a main body having a film take-up chamber and a film supply chamber on opposite horizontal sides of an exposure chamber and photograph taking means on a front side of said exposure chamber; a photographic film cassette accommodated in said film take-up chamber, a photographic film in a roll being disposed in said film supply chamber with a trailing end of said photographic film secured to a spool in said photographic film cassette; a rear cover for covering said main body from the rear so as to shield said photographic film from external light; and a front cover for covering said main body from front; the improvement wherein said front cover includes a grip projection located in front of said film take-up chamber to serve as a grip, and a flat portion located in front of said exposure chamber and said film supply chamber; and said film take-up chamber has a front section constituted by an arcuate wall, of which an inside surface extends forwardly beyond a flat forwardly open surface portion of said front cover.

24. A lens-fitted photographic film unit as recited in claim 23, further comprising an advancing member for winding an exposed portion of said photographic film into said photographic film cassette while rotating said spool of said photographic film cassette, said advancing member being disposed on the film take-up chamber to be operable externally.

25. A lens-fitted photographic film unit as recited in claim 24, wherein said film take-up chamber is located corresponding to grasping of a right hand of a photographer when said film unit stands oriented horizontally.

26. A lens-fitted photographic film unit as recited in claim 25, wherein said grip projection is so arcuate as to cover an outside surface of said arcuate wall.

27. A lens-fitted photographic film unit as recited in claim 26, further comprising an outer cover which is fitted on said lens-fitted photographic film unit.

\* \* \* \* \*